United States Patent Office 2,711,550
Patented June 28, 1955

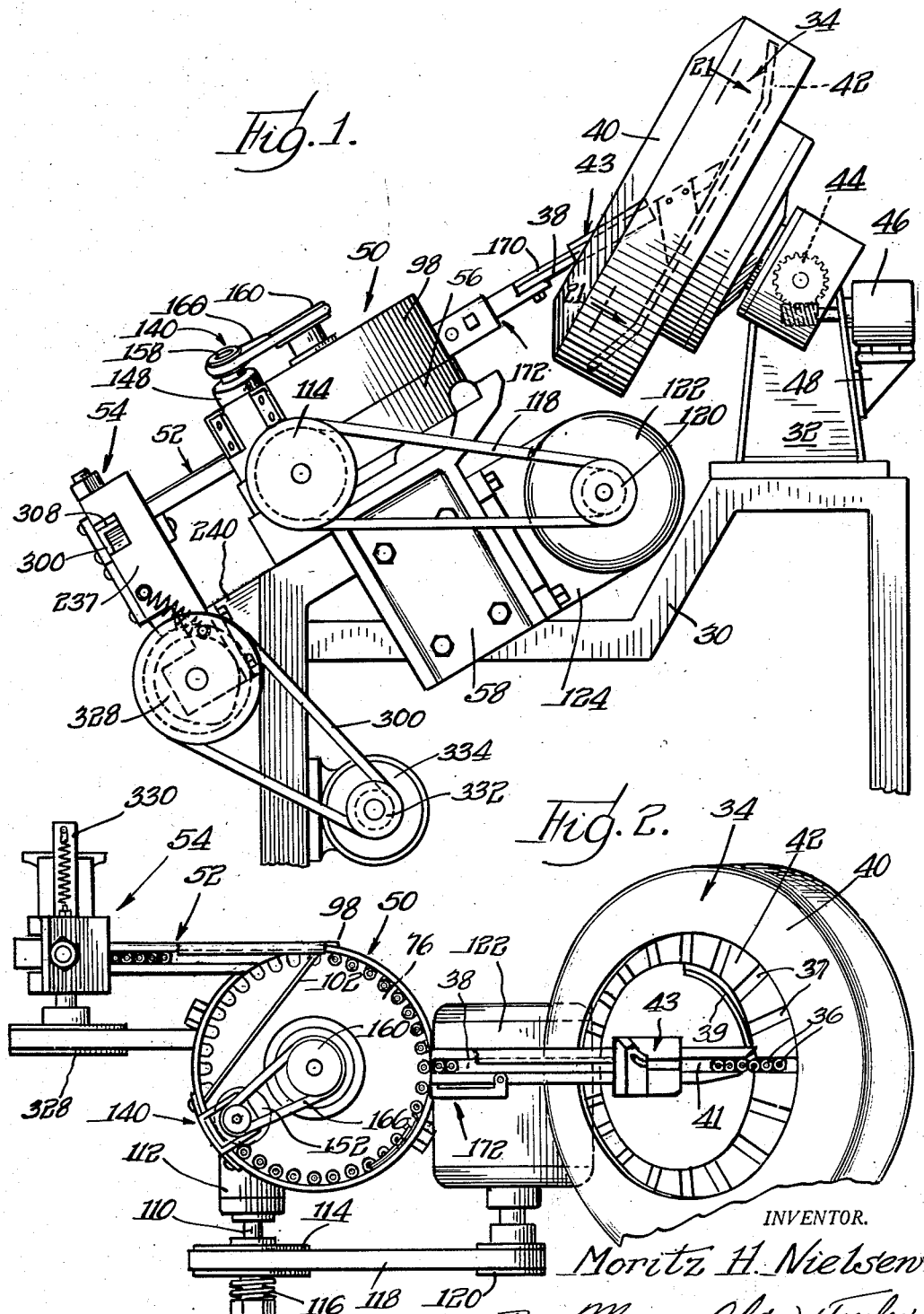

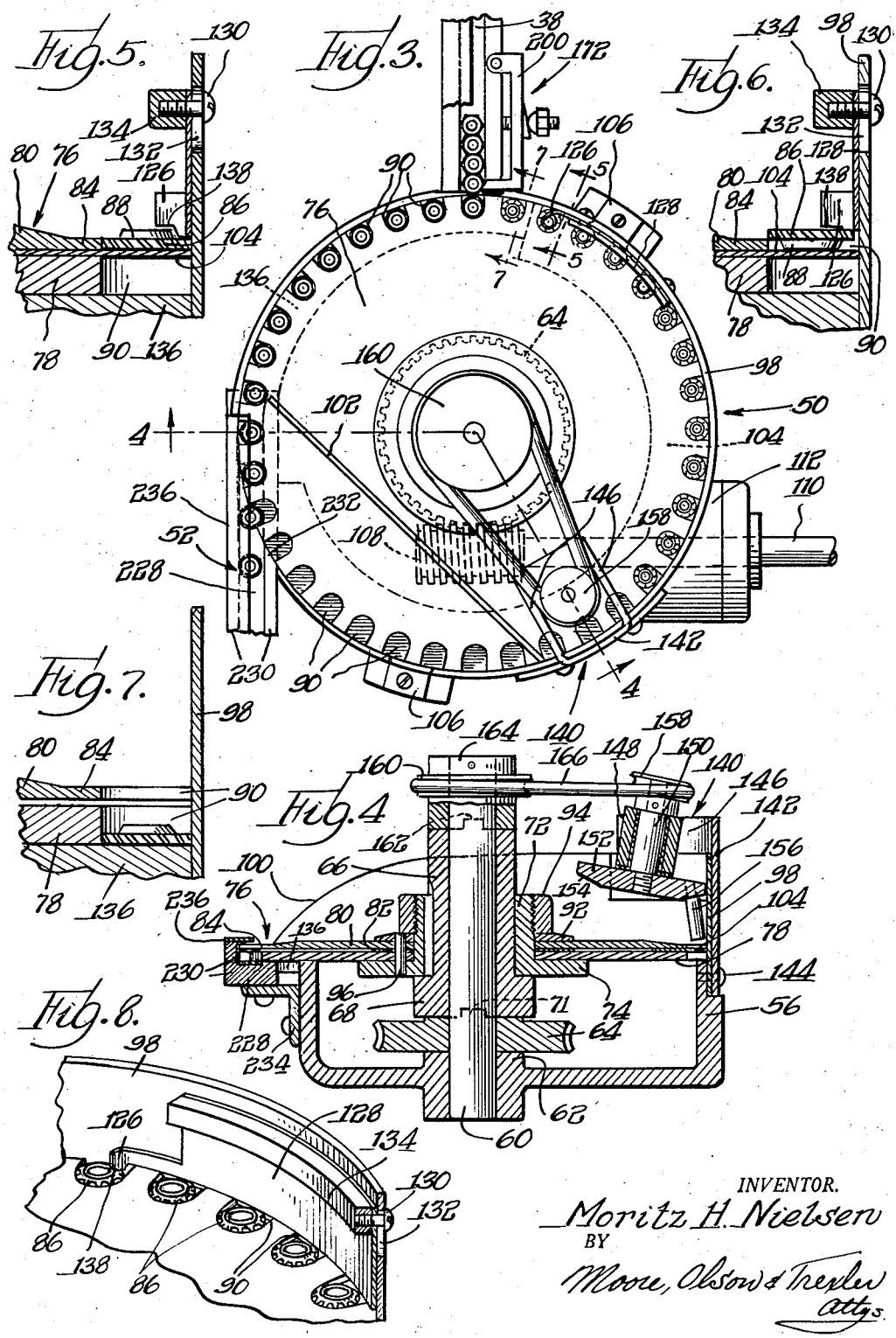

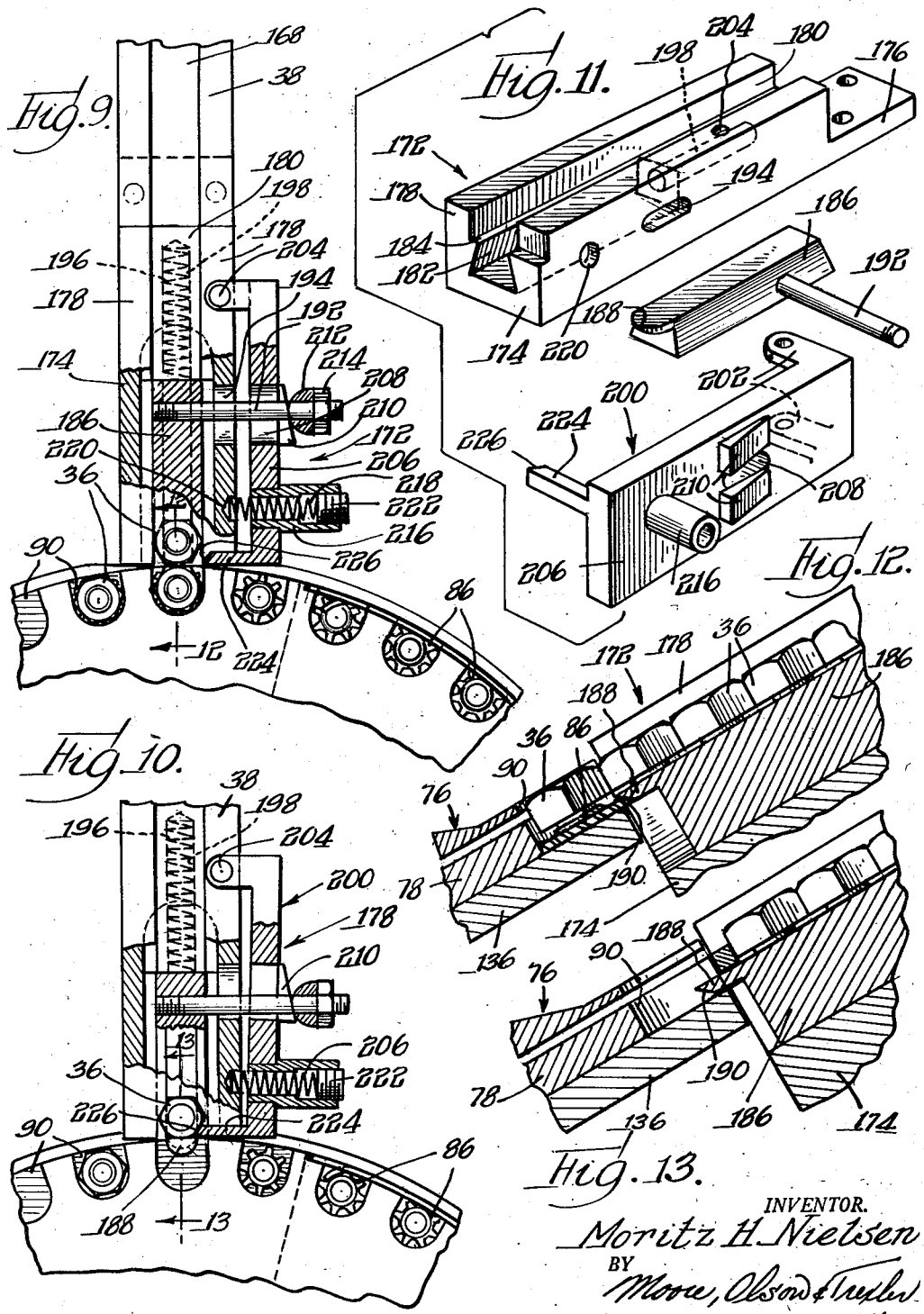

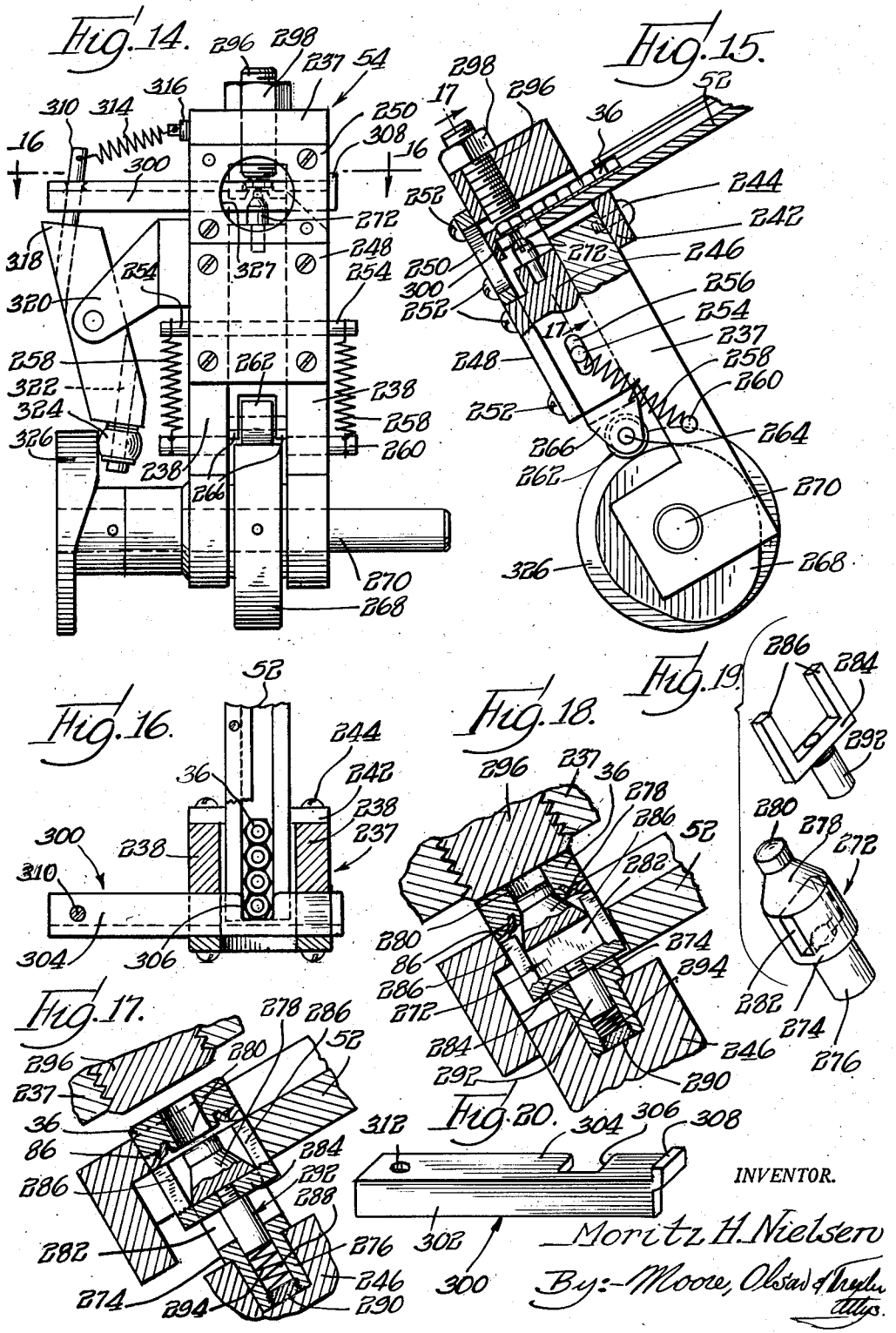

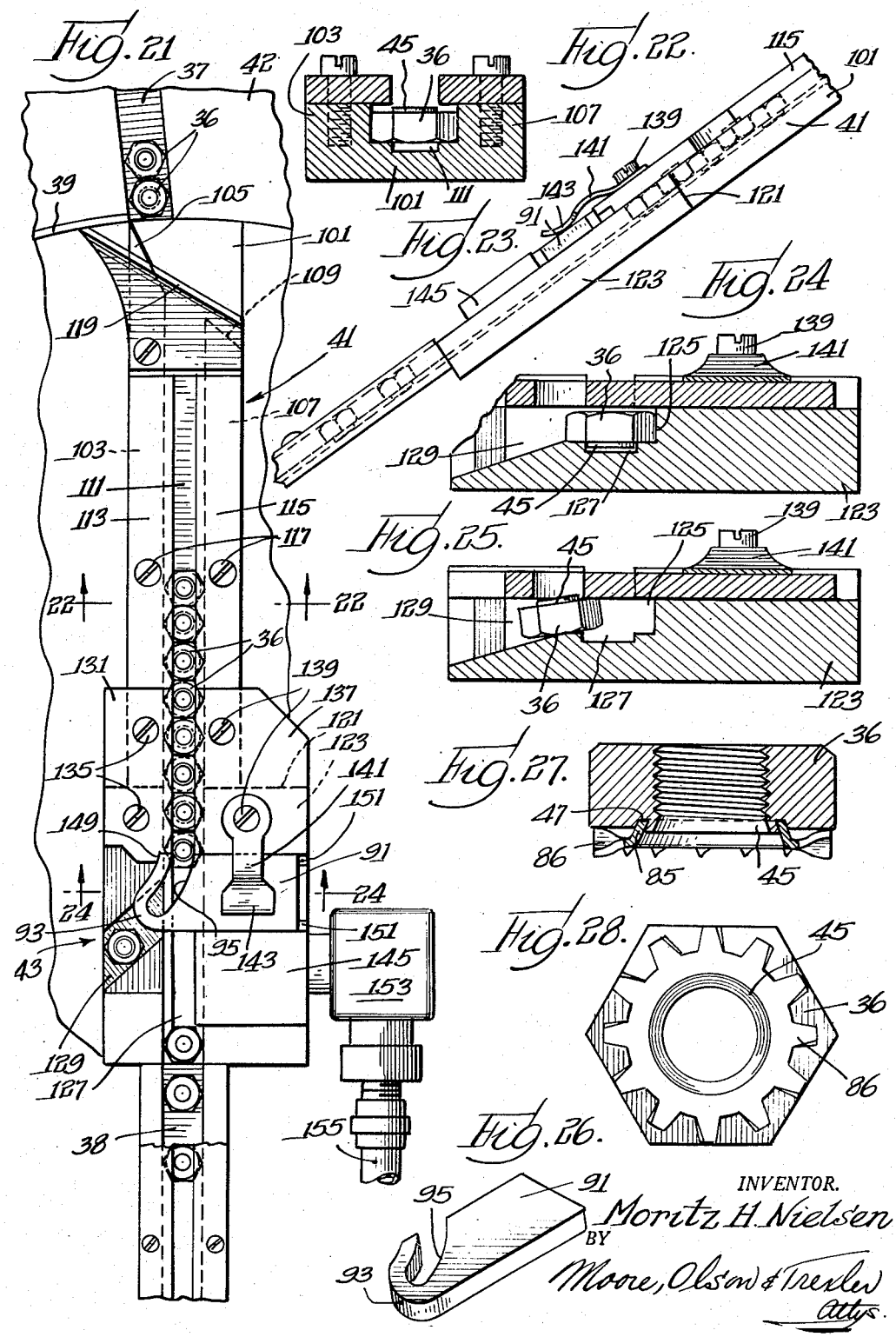

2,711,550

METHOD OF AND MACHINE FOR PERMANENTLY ASSEMBLING NUT AND WASHER ELEMENTS

Moritz H. Nielsen, Chicago, Ill., assignor to Illinois Tool Works, Chicago, Ill., a corporation of Illinois Application October 11, 1951, Serial No. 250,914

10 Claims. (Cl. 10—155)

This invention is concerned generally with the assembling of annuli and nut elements and more particularly with a machine for and a method of assembling flanged washers and flanged nuts.

The present invention contemplates the feeding of skirted, conical, or other washers having protuberances from the body portion, and hereinafter generically termed flanged washers, from a random mass over a predetermined path with the washer flanges all oriented in a given direction, bringing nut elements of the type having flanges or recesses into alignment with the washers with the washer flanges interfitting with the nut element flanges or recesses, and then swaging a portion of each nut element to maintain the nuts and washers in permanently assembled, relatively rotatable relation. It will be understood that the nuts or nut elements can be either threaded or unthreaded at the time of assembly with the washers.

An object of this invention is to provide an apparatus for assembling nut elements and flanged lock washers utilizing a common mechanism for feeding a succession of washers from a random mass with their flanges all oriented in a given direction and for bringing the washers into aligned juxtaposition with a succession of nut elements.

A further object of this invention is to provide an apparatus for assembling nut elements and flanged lock washers, said apparatus having means for aligning nut elements and flanged lock washers and telescoping means spaced from said aligning means for permanently telescoping the aligned washers and nut elements with no reaction on the aligning means.

An object of this invention is to provide a new or improved means and method for selecting and feeding flanged washers with the flanges, skirts or other protuberances of all the washers oriented in a given direction.

A more particular object of this invention is to provide a means for and method of selecting and feeding flanged washers by continuously conveying a succession of such washers over an inclined path from a random mass and maintaining washers with their flanges upwardly directed on said path while gravitationally returning washers having their flanges downwardly directed to said random mass.

Another object of this invention is to provide a means for and method of conveying flanged lock washers from a random mass over a predetermined path along a plane surface for selection according to the direction of orientation of the washer flanges and then to continue conveying the washers while supported in such manner as to insure proper settling of nut elements in aligned juxtaposition on top of the washers.

A further object of this invention is to provide, in a nut and washer assembly machine, a new or improved control or gate mechanism for releasing nuts one by one on to washers as the washers are conveyed past the control mechanism.

Another object of this invention is to provide an improved staking mechanism for permanently attaching aligned nuts and washers.

Other and further objects and advantages of the present invention will be apparent from the following description when taken in connection with the accompanying drawings wherein:

Figure 1 is a side view of an assembly machine embodying the principles of my invention;
Figure 2 is a top view of the machine;
Figure 3 is a top view of the washer hopper;
Figure 4 is a sectional view taken substantially along the line 4—4 of Figure 3;
Figure 5 is a sectional view taken substantially along the line 5—5 of Figure 3;
Figure 6 is a view similar to Figure 5 and showing a washer in inverted position;
Figure 7 is a sectional view taken substantially along the line 7—7 of Figure 3;
Figure 8 is a fragmentary perspective view showing the deflector finger of the washer hopper;
Figure 9 is an enlarged fragmentary plan view of the washer feed plate and nut element feed chute with certain parts broken away to show the nut control mechanism;
Figure 10 is a view similar to Figure 9 showing the nut control mechanism in a different position;
Figure 11 is an exploded perspective view of the nut control mechanism;
Figure 12 is an enlarged sectional view taken substantially along the line 12—12 of Fig. 9;
Figure 13 is a sectional view similar to Figure 12 and taken along the line 13—13 of Figure 10;
Figure 14 is an elevational view of the staking mechanism for permanently assembling the nuts and washers;
Figure 15 is a side view of the staking mechanism, certain parts being sectioned;
Figure 16 is a view taken substantially along the line 16—16 of Figure 14;
Figure 17 is a sectional view substantially along the line 17—17 of Figure 15;
Figure 18 is a view similar to Figure 17 and showing the parts in a different position;
Figure 19 is an exploded perspective view of the washer lifting and nut swaging portions of the staking mechanism;
Figure 20 is a perspective view of the slide for ejecting assembled nuts and washers;
Figure 21 is an enlarged detail view of the nut element selector mechanism taken substantially along the line 21—21 of Fig. 1;
Figure 22 is a cross-sectional view taken along the line 22—22 of Fig. 21;
Figure 23 is a view of the nut element selector mechanism taken from the right of Fig. 21;
Figure 24 is a cross-sectional view taken along the line 24—24 of Fig. 21 showing a nut element with the flange downwardly directed;
Figure 25 is a view similar to Fig. 24 with the nut element flange upwardly directed; and
Figure 26 is a perspective view of the slotted plate of the nut element selector for returning nut elements having their flanges upwardly directed to the hopper.
Figure 27 is a vertical section through the assembled nut and washer;
Figure 28 is a bottom plan view of the assembled nut and washer.

Referring first to Figures 1 and 2 for a general understanding of the machine and apparatus, there is shown a main frame or pedestal 30. An upstanding bracket 32 on the frame 30 supports a nut element supply mechanism including a nut hopper 34. The nut hopper 34 may be of any type well known in the art adapted to deliver a succession of nuts or nut elements 36 to an inclined nut element supply chute or track 38. As a specific example, the nut hopper 34 includes a casing or cover 40 adapted to contain a random mass of nut elements at the lower end thereof. A rotatable frusto-conical ring 42 is driven by suitable gearing 44 from an electric motor 46 carried on a motor mounting bracket 48 supported by the bracket 32. Grooves 37 in the ring pick up nut elements from the random mass and convey them upwardly past a retainer flange 39 to a stub track 41 which delivers them to a nut selector 43 with the flanges either up or down.

The nut feed chute or track 38 receives nut elements from the selector 43 with the nut flanges downwardly directed and feeds the nut elements to a washer supply mechanism including washer hopper 50 where the nuts are brought into aligned juxtaposition with a succession of washers. The aligned nut elements and washers then pass down a feed chute or track 52 to a staking mechanism 54 where the nut element finges are swaged outwardly to retain the nut elements and washers in assembled relation.

*The washer hopper*

The washer hopper 50 comprises a housing or casing 56 (Figs. 1 and 4) supported by a bracket 58 (Fig. 1) on the main frame or support 30. A stub shaft 60 extends upwardly from a boss 62 on the bottom wall of the casing 56. A worm wheel 64 is rotatably mounted on the shaft 60 within the housing 56. An upstanding bushing 66 having a peripheral flange 68 at its lower end fits over the stub shaft 60 and is secured to the worm wheel 64 for rotation therewith by means such as a tooth-in-slot connection 71. A cylinder 72 having a wide peripheral flange 74 at its lower edge fits over the bushing 66 and is keyed or otherwise fixed to the bushing for rotation therewith. A washer disc assembly 76 is mounted on the cylinder 72 for rotation therewith and includes a lower, relatively thick circular disc or plate 78. An upper disc or plate 80 is spaced above the disc 78 a short distance by a washer 82. The disc 80 is thick in its central portion and is relieved near the periphery thereof to provide a thin outer edge 84, this edge being of substantially the same thickness as a washer 86 exclusive of the neck, skirt or flange 88 thereon as may be seen in Figure 5. The discs 78 and 80 are provided with aligned recesses 90 equally spaced arcuately. A washer 92 is clamped against the top surface of the disc 80 by a nut 94 threaded on the upper end of the cylinder 72 to clamp the disc assembly 76 in place against the flange 74. Rotation of the disc assembly 76 with the cylinder 72 is insured by a pin 96 fitting through the discs 78 and 80 and through the washers 82 and 92.

The disc assembly 76 is inclined as indicated in Figure 1 and a peripheral wall 98 extends upwardly from the housing or casing 56 substantially in contact with the outer edge of the disc assembly 76. The wall 98 is cut down or relieved at 100 adjacent the upper end of the chute 52. The wall adjacent the bottom edge of the disc extends chordally across the top surface of the disc as at 102 to a position adjacent the top of the chute 52.

An arcuate separator plate 104 (Figures 3–6) extends inwardly from the outer periphery of the disc assembly 76 and from the inner edge of the chute 52 to a position adjacent the lower end of the nut element supply chute 38. The arcuate separator plate 104 is supported by a pair of lugs 106 upstanding from the casing or housing 56.

A worm gear 108 is mounted on a drive shaft 110 journaled in suitable bearings in a boss 112 formed on the side of the housing 56. A pulley wheel 114 on the shaft 110 is secured thereto preferably by means of a spring clutch mechanism 116 to drive the shaft 110 and hence to drive the disc 76. The pulley 114 is driven by a belt 118 passed over a pulley 120 on the output shaft of an electric motor 122 supported by a bracket 124 on the bracket 58.

As noted heretofore the thin outer edge of the upper plate 84 of the disc assembly 76 is of substantially the same thickness as a lock washer 86 exclusive of the skirt or neck 88. Thus lock washers which are piled up at a random mass on the lower portion of the disc assembly 76 against the wall 98, 102 settle into the recesses 90 and ride along the top of the separator plate 104 either as shown in Figure 5 or in Figure 6. When the washers are correctly oriented with their skirts or flanges 88 upwardly directed as shown in Figure 5 the washers seat firmly in the recesses. When the washers are received in the recesses 90 with the washer flanges downwardly directed as shown in Figure 6, the main portions of the washers are above the thin edge 84 of the plate 80 and the washers tend to fall out of the recesses to slide back down the disc assembly into the random mass of washers. Any washers positioned with their flanges downwardly which are not displaced from the recesses by gravity and vibration of the machine are deflected from the recesses by the tip 126 of a spring finger 128 mounted on the inclined face of the wall 98 by screws 130. The screws fit through vertical slots 132 for adjustment of the finger toward and away from the disc assembly 76 and the screws are threaded into a retaining member 134. The lower edge of the finger tip 126 is recessed at 138 to pass washers with their flanges upwardly directed as shown in Figure 5 and to engage and deflect washers with their flanges downwardly directed as shown in Figure 6.

Just after passing the finger tip 126 the washers pass the trailing end of the separator plate 104 and drop to the bottoms of the recesses 90 in the relatively thick bottom plate 78 to ride on a supporting plate 136 (Figure 7) for assembly with nuts as will be apparent hereinafter.

Twisted tooth lock washers, and particularly such lock washers having axially directed skirts, necks or flanges such as are handled by the apparatus and method herein disclosed, tend to clump together. To defeat this tendency an agitator 140 (Figures 1–4) is provided. The agitator includes a bracket 142 upstanding along the wall 98 and secured to the casing 56 by means such as bolts or screws 144. A pair of arms 146 extends inwardly over the disc 76 and supports a bearing 148 inclined slightly from the perpendicular relative to the disc assembly 76. A shaft 150 is journaled in the bearing 148 and a wheel 152 is threaded on the lower end of the shaft. The lower face of the wheel is relieved near the periphery thereof to provide a substantially conical surface 154. A finger 156 extends downwardly from the conical surface 154 and very nearly contacts the disc 76 when near the outer edge thereof. A pulley wheel 158 is fixed on the upper end of the shaft 150 for rotating the same.

A pulley 160 is mounted for rotation on the stub shaft 60 and is fixed to the bushing 66 for rotation therewith by means such as a tooth-in-slot connection 162. A collar 164 is pinned to the top of the shaft 60 to maintain the pulley 160, the bushing 66 and the structure including the disc assembly 76 carried thereby, and the worm wheel 64 on the shaft and locked together for rotation. A flexible belt 166 passes around the pulleys 160 and 158 for driving the latter. It will be apparent that the finger 156 moves up and down in the random mass of washers on the lower portion of the disc assembly 76 as well as rotates in the mass to keep the washers of the mass from clumping together.

*The nut supply mechanism*

Reference should be had to Figs. 21–26 for details on the nut element selector 43. The recesses 37 of the ring 42 pick up nut elements 36 as the ring rotates to pass the recesses or grooves 37 successively beneath a random mass of nut elements lying in the lower portion of the hopper 24. Continued rotation of the ring 42 raises the nut elements toward the upper portion of the hopper, the nuts being held in the grooves by an arcuate plate or flange 39 fixed on the stationary central portion of the hopper along the inner edge of the ring 42.

The stub track 41 receiving the nut elements from the ring 42 includes a bottom plate 101 substantially contacting the inner edge of the ring 42 and on a level with the bottoms of the grooves or recesses 36 at the inner ends thereof. A first guide rail 103 is secured along one longitudinal edge of the plate 101 and extends to the upper edge of the plate 101, the guide rail 103 having its inner edge relieved at the upper end 105 to centralize nut elements 36 on the plate 101. A second longitudinal guide rail 107 lies along the opposite edge of the plate 101 and is spaced from the guide rail 103 just slightly greater than the maximum diameter of one of the nut elements 36. The upper end of the guide rail 107 is beveled at 109 to facilitate passage of nut elements from the plate 101 when the space between the rails 103, 107 is completely filled. The plate 101 and rails 103 and 107 preferably are formed integral as shown in Fig. 22.

The nut elements 36 as seen most particularly in Figs. 27 and 28 are of the type having flanges 45 initially extending axially from the clamping faces of the nuts and known in the trade as "stub shafts." Circular grooves 47 surround the nut element flanges 45 for receipt of the conical flanges 85 of the washers 86. Outward swaging of the nut element flanges 45 to the position shown in Figs. 27 and 28 rotatably traps the washer flanges 85 for permanent assembly.

The plate 101 of the stub track 41 is provided with a longitudinal recess 111 to accommodate the flanges, stub shafts, or other protuberances 45 of nut elements 36 having the flange downwardly directed. The flanges have been exaggerated slightly in axial extent for illustrative purposes and extend parallel to the axis of the nut before being staked or swaged for permanent assembly of the nut with a lock washer.

Longitudinal retainer strips 113 and 115 are secured along the upper edges of the guide rails 103 and 107 by suitable means such as screws 117 and partially overlie the space between the rails to retain the nut elements in proper position in the chute or track 41. An upwardly curved deflecting plate 119 is secured to the upper end of the chute or track 41 for insuring proper seating of nut elements beneath the retainer strips 113 and 115. The curved plate 119 has its upper portion angled somewhat similarly to the relieved or beveled rail edges 105 and 109 to deflect nut elements back into the hopper should the nut elements tend to pile up on top of one another as they pass from the recesses or grooves 37.

The chute or track 41 is terminated at its lower end at 121 and a relatively wide block 123 is suitably fixed to the lower end of the chute and is longitudinally recessed at 125 to provide a continuation of the washer cute 41. A second recess 127 of lesser extent extends longitudinally of the recess 125 in the lower face thereof to provide clearance for the nut element flanges of nut elements having their flanges directed downwardly. The block is provided with a further recess or groove forming a side track 129 branching from the longitudinal groove 125.

A plate 131 is secured by means such as screws 135 to the top of the block 123 and to the top of the guide rail 103 and forms a continuation of the retaining strip 113. Similarly a plate 137 is secured to the top of the block 123 and to the top of the guide rail 107 by means such as screws 139. The lowermost screw 139 additionally secures a leaf spring 141 having a broad tongue portion 143 bearing upon and holding down a plate 91 fitting on top of the block 123 and between the plate 137 and a plate 145.

The plate 91 as particularly may be seen in the perspective view of Fig. 26 has a rounded outer end portion 93. A recess 95 curves into this end portion and leads directly into the side track 129 as best may be seen in Fig. 21.

Nut elements 36 passing down the stub track or chute 41 with their flanges 45 downwardly directed pass into the block 123 with the nut element flanges fitting in the narrow recess 127 as shown in Fig. 24 and pass under the plate 91 to continue down the groove or track 127 to the combination gate and starter mechanism as will be set forth hereinafter.

Nut elements 36 which have their flanges 45 upwardly directed have their flanges engaged by the slot 95 of the plate 91 and are deflected into the side track 129 as shown in Fig. 25. Endwise motion of the plate 91 (transversely of the chute 41 and block 123) is prevented by interfitting of the plate 91 with the plate 131 at 149 and by flange means 151 either on the block 123 or on the plates 137 and 145, and extending past the transverse end of the plate 91. The spring mounting of the plate 91 facilitates ready insertion and removal of the plate and provides a quick and easy means for clearing any possible jam such, for instance, as might be caused by defective nut elements.

Nut elements 36 passing into the side track 129 drop off the edge of the block 123 back into the random mass in the hopper.

To insure proper jam free feeding of nut elements through the selector 43 and the chute 38, an air vibrator 153 is secured to the side of the selector. The air vibrator is of conventional construction and is supplied with air under pressure through a pneumatic line or hose 155.

Nuts or nut elements 36 in the nut chute or track 38 leading from the hopper 34 may be maintained in the central recesses 168 of the track by a bar or rail 170 (Fig. 1) overlying the central recesses. A nut release mechanism 172 is secured to the lower end of the chute 38 and forms a continuation thereof for releasing nuts one by one into the recesses 90 of the disc when the recesses are occupied by washers and for preventing release of nuts when no washers are present. As best seen in Figures 9–13 the nut release mechanism includes a slideway 174 having a bottom plate-like portion 176 adapted at its upper end to be screwed, bolted or otherwise secured to the lower end of the chute 38. A pair of upstanding walls 178 extending longitudinally of the slideway 172 throughout the greater portion of its length defines a central recess 180 forming a continuation of the chute recess 168 and through which the nuts slide. A dovetail guideway 182 underlies the outer extremity of the recess 180 and communicates therewith, shoulder portions 184 being provided between the recesses and dovetail guideway 182.

A dovetail slide 186 fits in the guideway 182 and is provided with a forwardly extending finger or tip 188. The tip is substantially semi-circular when viewed from above and in longitudinal section has a beveled edge 190 as best may be seen in Figures 12 and 13. A transverse control rod 192 is threaded into the slide 186 and extends through a longitudinally elongated aperture 194 in one of the flanges or side walls 178. A coil spring 196 is housed in a bore 198 in a central portion between the walls or flanges 178 and bears against the rear, or upper end of the slide 186 and normally urges the slide toward the outer end of the slideway 182, movement in this direction being limited by abutment of the control rod 192 against the end of the slot 194.

A control lever 200 is provided with a pair of spaced apart ears 202 by means of which it is pivotally connected to the slideway 174 at 204. The main arm 206 of the control lever 200 is in the form of a flat plate lying adjacent one of the side walls or flanges 178. The arm 206 is provided with a longitudinally elongated aperture 208 aligned with the aperture 194 for accommodating the control rod 192. Wedge shaped cams 210 are spaced on opposite sides of the aperture 208 and a substantially hemispherical cam follower 212 on the control rod 192 is held against the cams 210 by a nut 214 threaded on the outer end of the control rod.

A transverse cylinder 216 is threaded or otherwise secured in an aperture in the lever arm 206 and houses a compression spring 218. The inner end of the spring 218 is received in a recess 220 in the adjacent side wall or flange 178 and the outer end of the spring bears against a plus 222 threaded into the outer end of the cylinder 216. The plug 222 serves both as a back-up member for the spring 218 and also as a means for adjusting the force exerted by this spring.

The control lever 200 is completed by a release finger 224 extending transversely into the path of nut elements 36 sliding on top of the slide 186 and the shoulders 184 so as normally to prevent release of the nuts, or nut elements. The outer end of the tip of the finger is beveled at 226.

The top surface of the slide 186 is spaced slightly above the plate 136 (Figure 12) which supports the washers after they have dropped off the separator plate 104 into the lower portions of the recesses 90 and the tip extends successively into each recess 90 under the influence of the spring 196 if the finger does not encounter a washer. Normally the finger is held back by engagement with the edge of the lower plate or disc 78 of the disc assembly 76 or by engagement with a washer 86 in a recess 90. When the tip is so held back the cam follower 212 on the control rod 192 contacts the cams 210 relatively near the back or lower ends thereof so that the control lever 200 is shifted slightly outwardly under the influence of spring 218. This retracts the beveled tip 226 of the release finger 224 from the path of the nuts or nut elements 36 so that a nut element 36 is free to shift under the force of gravity from the release mechanism 172 into one of the recesses 90 on top of the washer in the recess. It will be undertsood that a relatively loose fit is provided between nut elements and the side walls 178 and recesses 90 so that the nut elements can pass into the apertures or recesses 90 while the disc assembly 76 is rotated continuously at a uniform constant rate. Inherent vibration of the machine insures proper alignment and settling of the nut on top of the washer.

If no washer is present in a recess 90 the finger 188 and slide 186 shift forwardly under the influence of spring 196 to the postion shown in Figure 13. This causes the cam follower 212 to ride against a higher portion of the cams 210 and thus to force the control lever 200 inwardly against the action of spring 218. The beveled finger tip 226 thus engages the lowermost nut so that no nuts can shift into washerless recesses.

*The staking mechanism*

The chute 52 underlies the edge of the disc assembly 76 and extends substantially tangentially therefrom. The chute 52 includes a central recess 228 (Figs. 3 and 4) between parallel side rails or flanges 230. The inner of the rails 230 is provided with a relieved portion presenting an arcuate shoulder 232 substantially in contact with the edge of the disc assembly 76. The upper end of the track is supported by an angle bracket 234 secured on the side of the housing 56 while the lower end is secured by the staking mechanism shortly to be described. A cover plate 236 is supported by the outer rail 230 and overlies substantially half of the recess 228 and also overlies a portion of the disc assembly 76 to insure proper fitting of the washer and nut assemblies in the chute.

The end of the nut chute 52 abuts the supporting plate 136 so that assembled nuts and washers in the recesses 90 will leave the end of the plate 136 and pass into the chute 52 under the force of gravity.

After leaving the disc assembly 76 aligned and superposed the nut elements and washers slide down the chute 52 to the staking mechanism 54. The staking mechanism 54 (Figs. 1, 2 and 14–20) comprises a frame 237 having a pair of side or main plates 238 suitably supported by a bracket 240 extending from the main frame or pedestal 30. The lower end of the chute 52 extends between the side plates 238 and is supported by a cross bar 242 secured by any suitable means such as bolts 244 to the plates 238.

Slide 246 is slidably held in the frame 237 between the side plates or walls 238 by plates 248 and 250 secured on the side plates or walls by any suitable means such as screws 252. Pins 254 extend transversely from the slide 246 through elongated apertures 256 and springs 258 are stretched between the pins 254 and pins 260 on the frame 237 and below the pins 254. A cam follower roller 262 is carried on a pin 264 between a pair of arms 266 at the bottom of the slide 246. The cam follower roller 262 is urged by the springs 258 against a cam 268 fixed on a cam shaft 270 journaled in suitable bearings near the lower ends of the plates or walls 238.

A nut swaging tool or staking pin 272 is carried at the top of the slide 246 and the configuration and mounting thereof best are seen in Figs. 17–19. The staking pin 272 comprises a cylindrical body 274 having a reduced neck portion 276 at the lower end thereof. A conical portion 278 leads upwardly of the cylindrical body 274 to a tip 280 having a rounded off upper end. The reduced neck portion 276 is received in an aperture in the top of the slide 246 and is fixed therein by any suitable means such as being sweated into place. The body 274 is provided with a transverse aperture or slot 282 within which is housed a yoke 284 having parallel side arms 286. The reduced neck portion 276 is provided with an axial bore 288 opening at its upper end into the transverse slot or aperture 282 and closed at its lower end by a plug 290 threaded into the lower end of the bore. A cylindrical stub shaft 292 is housed within the bore 288 and has a reduced upper end threaded into the cross arm of the yoke 284. A coil spring 294 is compressed beneath the stub shaft 292 in the bore 288 and normally urges the yoke upwardly to the position shown in Fig. 17. An anvil 296 in the form of a threaded rod is adjustably positioned above the staking pin 272 and in axial alignment therewith. A jam nut 298 is threaded on the anvil and abuts the top of the frame 237 to lock the anvil in adjusted position.

A nut slide 300 (see particularly Fig. 20) is transversely disposed in the frame 237 in suitable slots in the side wall. The nut slide 300 comprises an angle member having a vertical wall 302 and a horizontal wall 304. A substantially rectangular opening 306 is provided in the horizontal wall 304 for receiving a nut from the chute 52 when aligned with the chute. The outer corners of the aperture or recess 306 are rounded or beveled to facilitate entry of nuts. An upturned flange 308 on one end of the slide forms a stop limiting movement of the slide 300 in one direction.

A pin 310 is pivoted in an aperture 312 in the horizontal plate of the nut slide 300 and a coil spring 314 is stretched between the upper end of the pin 310 and a screw 316 threaded into the upper end of the frame 237 on one side thereof. The tension on the spring 314 can be adjusted by threading the screw 316 in and out.

The lower end of the pin 310 is fixed in a lever arm 318 pivoted between a pair of arms 320 of a bracket secured on the side of the frame 237. The lower end of the lever carries a pin 322 on which is rotatably journaled a cam follower 324. The cam follower 324 rides against the face of a cam 326 fixed on the cam shaft 270. A high part on the cam normally retains the slide 300 retracted against the action of spring 314 with the recess 306 in alignment with the chute 52. A low portion of the cam allows the spring to shift the slide longitudinally of the slide to eject nuts and washers assembled therewith to one side of the staking mechanism 54. The advancement of the nut slide 300 under the influence of spring 314 to eject an assembled nut and washer prevents damage to the mechanism in case of a jam. A circular aperture 327 is provided in the plate 250 for clearance of any jam that might develop.

A pulley 328 is fixed on the outer end of the cam shaft 270 and a belt 330 transmits power to this pulley from a pulley 332 on the shaft of a motor 334 carried by the main frame 30 of the machine.

The staking pin 272 is in its lowermost position, as shown in Fig. 17, when the slide 300 is fully retracted to receive an assembled washer and nut element. The bottom of the chute 52 is provided with a suitable aperture to allow passage of the staking pin and yoke arms 286 as the staking pin is moved upwardly by the cam 268. The yoke arms 286 engage the washer 86 before the tip 280 of the staking pin engages the flange of the nut element 36 as shown in Fig. 17. The yoke then lifts the washer and the nut element until the nut element engages the anvil 296, at which time the yoke yields against the spring 294. The rounded off tip 280 centralizes the nut element and passes upwardly into the nut bore until the conical portion 278 engages the nut flange and swages the same outwardly as shown in Fig. 18.

The cam 268 then allows the springs 258 to retract the slide 246 following which the cam 326 allows the spring 314 to shift the slide 300 longitudinally to eject the permanently assembled nut and washer from one side of the staking mechanism 54.

It will be apparent that I have herein disclosed a practical apparatus for and method of selecting flanged washers from a random mass and for bringing the washers into alignment with nuts by a simpler means and method than heretofore thought possible through the use of a single mechanism as a washer hopper and for aligning the washers and nut elements. A nut element is not released for such assembly unless a washer is in proper position to receive the nut element, and following such assembly the nut elements and washers are transferred to another station to be permanently secured together by an improved staking mechanism acting to swage or deform a portion of the nut element. The swaging of the nut at a station displaced from the washer hopper precludes the possibility of any reaction on the hopper.

Although a particular embodiment of this invention has been shown and described, it will be apparent that various changes can be made without departing from the principles of the invention as expressed in the following claims.

I claim:

1. The method of assembling washers and nut elements which comprises feeding washers from a random mass along a first predetermined path, displacing those of said washers other than in a predetermined position from said path and returning the displaced washers to said random mass, axially shifting those washers in said predetermined position a predetermined distance from said first predetermined path, continuing the axially shifted washers along a second predetermined path forming substantially a continuation of said first predetermined path but displaced therefrom, bringing a succession of nut elements into axially aligned contact with said washers, and forcing the aligned, contacting washers and nut elements into permanently assembled relation.

2. Apparatus for assembling lock washers and nut elements comprising a movable feed carrier receiving on its surface a supply of washers and having marginally disposed recesses receiving washers from the surface of the feed carrier, a second movable carrier spaced below said feed carrier and having outwardly opening edge recesses in alignment with the recesses of said feed carrier, means for driving both of said carriers in unison, fixed supporting means of limited extent positioned between said feed carrier and said second carrier for first supporting lock washers in the recesses of said feed carrier and then dropping the washers into the recesses of said second carrier, means adjacent said carriers for placing nut elements in the recesses above the dropped lock washers, and means receiving the washers and nut elements carried by said carriers for telescoping the nut elements and lock washers into permanently assembled relation.

3. Apparatus for assembling washer elements and nut elements comprising a movable feed carrier receiving on its surface a supply of washer elements and having outwardly opening edge recesses receiving washer elements from the surface of the feed carrier, a second movable carrier spaced below said feed carrier and having outwardly opening edge recesses in alignment with the recesses of said feed carrier, means for driving both of said carriers in unison, a fixed support of limited extent positioned between said feed carrier and said second carrier for first supporting washer elements in the recesses of said feed carrier and then dropping the washer elements into the recesses of said second carrier, means adjacent said carrier for placing nut elements in the recesses on top of the dropped washer elements in substantial alignment therewith, means for deforming at least one of each pair of aligned elements to maintain the elements in permanently assembled relation, and means including said second carrier for feeding said nut elements and washers to said deforming means.

4. Apparatus for assembling lock washers and nut elements comprising movable feed plate means receiving on the surface thereof a supply of washers and having marginally disposed recesses receiving washers from the surface of the feed plate means, means for driving said feed plate means, means adjacent said feed plate means for placing nut elements on top of the lock washers in said recesses, a downwardly facing anvil, means for feeding aligned lock washers and nut elements from said feed plate means to a position below said anvil, and means beneath said anvil for lifting the aligned nut elements and lock washers to force them against said anvil for forcing the lock washers and nut elements into permanently assembled relation.

5. Apparatus for permanently assembling axially aligned lock washers and nut elements, the nut elements having axially directed flange means cooperable with said lock washers, said apparatus comprising an overhead anvil, a swaging tool postioned below said anvil and having a rounded locator head and a frusto-conical swaging section adapted to swage the nut element flange means outwardly to underlie a portion of said lock washer, a spring loaded supporting member carried by said swaging tool for engaging and lifting a lock washer with its aligned nut element, means for shifting said swaging tool upwardly to force said nut element against said anvil for deforming said nut element flange means permanently to assemble said nut element and lock washer, an ejector for ejecting permanently assembled lock washers from said apparatus, and means for operating the nut element swaging tool and the ejector in timed relation.

6. Apparatus for permanently assembling lock washers and nut elements as set forth in claim 5 wherein the supporting member comprises a pair of arms diametrically engageable with the washers.

7. Apparatus for permanently assembling lock washers and nut elements as set forth in claim 5 wherein the ejector comprises a member formed with a section to position the aligned washers and nut elements for swaging, and for thereafter carrying the aligned nut elements and washers away.

8. Apparatus for permanently assembling lock washers and nut elements as set forth in claim 7 wherein the ejector member comprises a slide having a recess therein for positioning the washers and nut elements.

9. Apparatus for assembling flanged lock washers and nut elements having washer flange accepting clamping faces, said apparatus including a washer hopper having a rotatable feed plate adapted to receive on its surface a random mass of individual flanged lock washers, said feed plate having a plurality of outwardly opening edge recesses adapted to receive flanged lock washers from said random mass, means for rotating said feed plate at a predetermined rate, means for displacing improperly seated washers from said recesses and passing only those having their flanges upwardly directed, means adjacent said washer hopper for positioning nut elements with their washer flange accepting clamping faces down in said recesses on top of said lock washers and in alignment therewith, means for telescoping the aligned washers and nut elements, and means including said feed plate for feeding the aligned nut elements and washers to said telescoping means.

10. Apparatus for assembling flanged lock washers and nut elements having washer flange accepting clamping faces, said apparatus including a washer hopper having a rotatable feed plate adapted to receive on its surface a random mass of individual flanged lock washers, said feed plate having a plurality of outwardly opening edge recesses adapted to receive flanged lock washers from said random mass, means for rotating said feed plate at a predetermined rate, means for displacing improperly seated washers from said recesses and passing only those having their flanges upwardly directed, means adjacent said hopper for positioning nut elements with their washer flange accepting clamping faces down in said recesses on top of said lock washers and in alignment therewith, means for feeding the aligned washers and nut elements away from said feed pate, and means to which the aligned washers and nut elements are fed by said last named feeding means for permanently telescopically associating the aligned washers and nut elements.

References Cited in the file of this patent

UNITED STATES PATENTS

| Number | Name | Date |
|---|---|---|
| 1,616,641 | Tainter | Feb. 8, 1927 |
| 1,805,123 | Wilcox | May 12, 1931 |
| 1,839,450 | Swangren | Jan. 5, 1932 |
| 1,861,889 | Stoll | June 7, 1932 |
| 1,879,156 | Forster | Sept. 27, 1932 |
| 1,946,820 | Stoll | Feb. 13, 1934 |
| 2,086,128 | Hackbarth et al. | July 6, 1937 |
| 2,273,783 | Irwin | Feb. 17, 1942 |
| 2,303,226 | Olson | Nov. 24, 1942 |
| 2,343,798 | Poupitch | Mar. 7, 1944 |
| 2,500,376 | Pellow et al. | Mar. 14, 1950 |